July 29, 1952 K. M. ADAIR 2,605,015
TWO-WAY LIQUID SEAL TRAP
Filed Oct. 29, 1948 2 SHEETS—SHEET 2
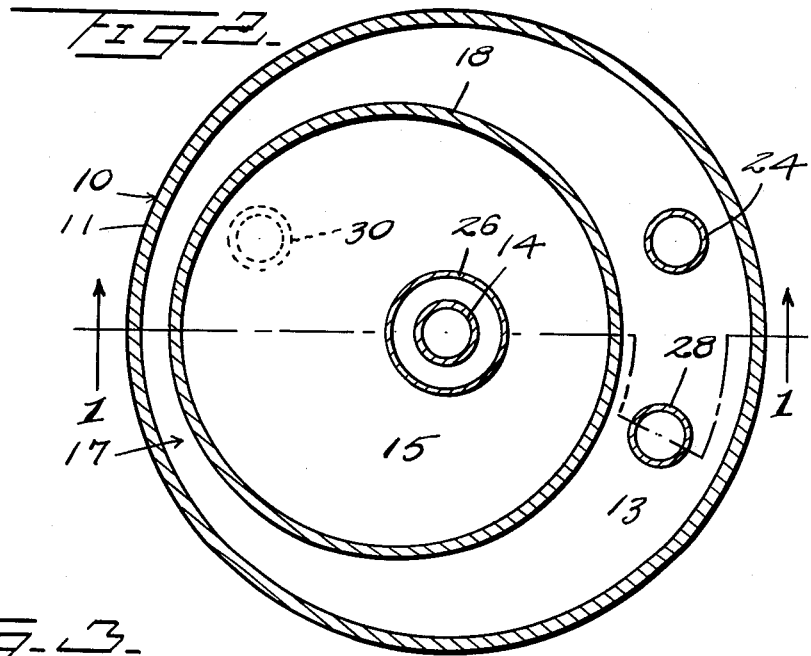
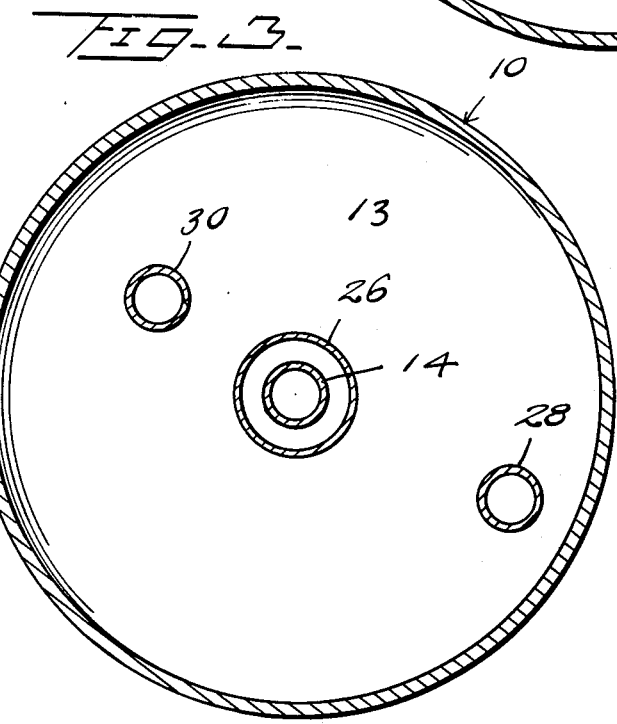
Inventor
K. M. Adair
By
Kimmel & Crowell Attys.

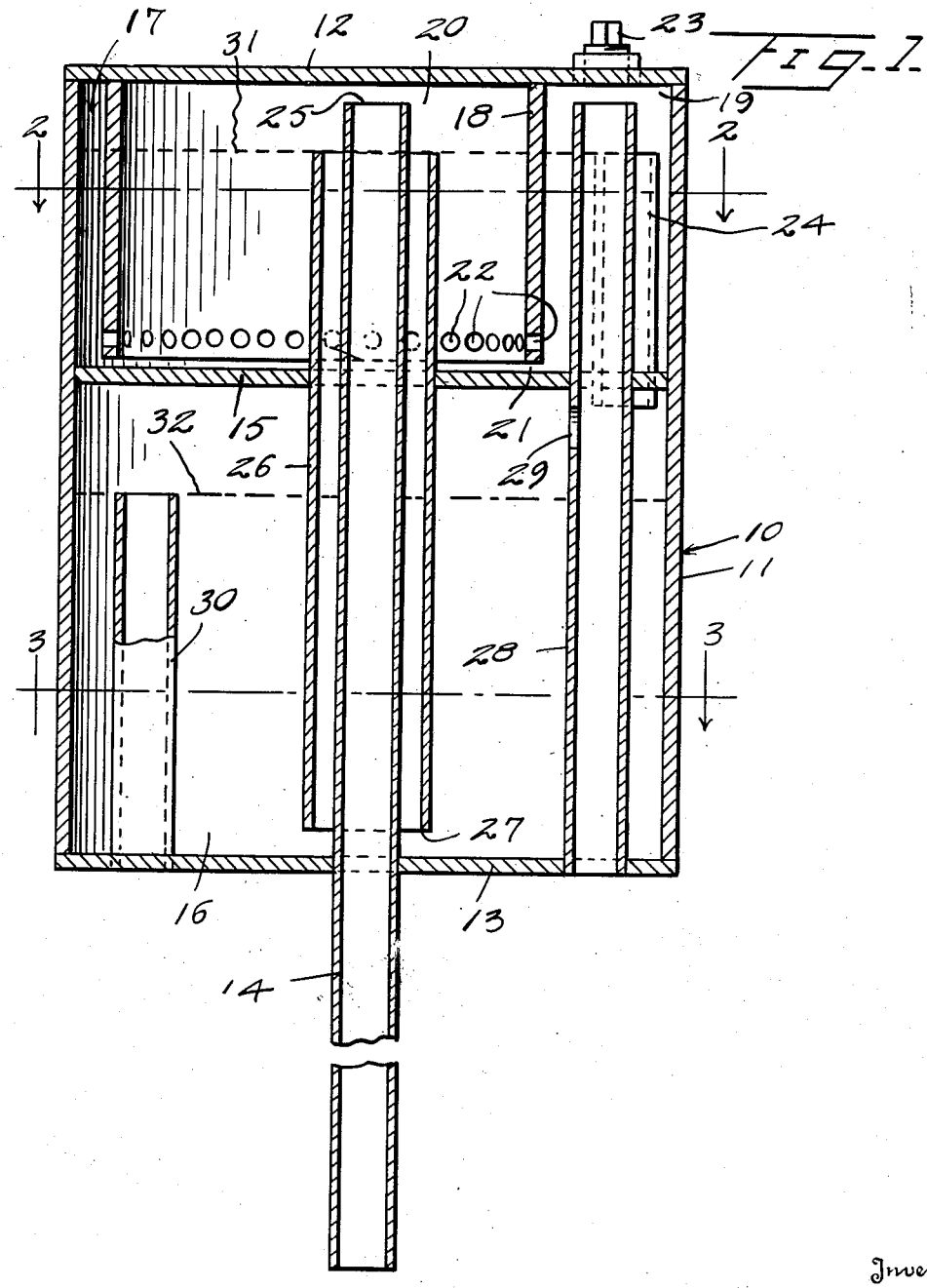

UNITED STATES PATENT OFFICE 2,605,015

TWO-WAY LIQUID SEAL TRAP

Keith M. Adair, Eugene, Oreg.

Application October 29, 1948, Serial No. 57,304

1 Claim. (Cl. 220—85)

This invention relates to a liquid sealing means for containers.

An object of this invention is to provide an improved seal for a container for volatile liquids which will effectively seal the vent of the container and at the same time permit expansion or contraction of the liquid in the container without loss of the liquid contents or the gases emanating from the liquid.

Another object of this invention is to provide a liquid seal embodying a series of chambers whereby the excess sealing liquid will overflow into the atmosphere, and excessive pressure in the container may be relieved.

In one form of this invention there are two upper chambers and a lower chamber communicating with the upper chambers through overflow pipes, together with means whereby excessive liquid will be drained from the upper and lower chambers into the atmosphere without breaking the seal and without the possibility of any excess seal fluid entering the vent tube to the container to which the unit is attached.

A further object of this invention is to provide a liquid seal for the vent of a container which will effectively prevent any foreign matter entering the tank while admitting filtered air into the container or the release of excessive pressure from the container.

A further object of this invention is to provide a device of this kind wherein moving parts have been eliminated so that the device will function at all times.

A further object of this invention is to provide a liquid seal including a pair of upper chambers connected together, and a lower chamber connected to both upper chambers, one of the upper chambers being connected to the vent of a tank or container, and under normal conditions there will be a pressure differential between the two upper chambers and also between one of the upper chambers and the lower chamber. The lower chamber communicates with the atmosphere and atmospheric pressure is present at all times in the other of the upper chambers.

As conductive to a clearer understanding of this invention it may here be pointed out that storage tanks and supply tanks of many and varied sizes and shapes are employed on railroad cars, automobiles, ships, stationary power plants, stationary storage tanks, and in other ways, in the storing of gasoline, fuels oils, and other volatile fluids, and it is highly important that such tanks be vented properly in order that outside air might be drawn into such tanks when fluid is drawn out of the tank, or when the tank cools and the contents condense and contract as at night when the temperature falls, or in order that air inside the tank might escape therefrom when pressure is created because fluid is added to the contents thereof or because the contents of the tank expand due to the normal heat caused by the customary rise in temperature during the daytime.

When an open vent is provided for a tank, the free atmospheric air will carry dust particles, water vapor, and other foreign matter into the tank when there is a vacuum or decreased pressure inside of the tank, and when the air inside of the tank passes freely out of the tank, it will carry with it varying quantities of the fluid contained therein, which has evaporated and has changed to a gaseous state. Thus, it is highly important that such vent be sealed, and that as much resistance as is practicable, in view of the size of the tank, its strength, and the nature of its contents, be maintained against the passage of air either into or out of such tank.

Due to the possibility of mechanical failure that might result in the use of any moving parts of a valve or seal due to rust, corrosion, or the lodging of foreign particles therein, it is extremely important that such a seal be designed without such moving parts, thus eliminating the possibility that excessive pressure or vacuum might be necessary in order to overcome the valve, thus endangering the very structure of the tank itself, or that a rusty or corroded, or dirty valve seat might not seat perfectly, and thus not operate as a seal at all, but instead would admit the passage of air into or out of the tank at will.

It is commonly known that at night, when there is a certain degree of cooling, the contents of the tank will contract when the vapors therein condense, thus air is drawn into the tank from the outside, and when such air is very humid, a substantial amount of moisture will be drawn into the tank over a period of time, and also will be drawn into the seal or trap, and will condense in the trap, thus adding to the volume of the seal fluid itself. In addition to the water that will thus enter the unit, a certain amount of dust particles and similar objectionable matter will enter the trap and will remain there, adding to the volume of the seal fluid contained therein. It is very desirable that a minimum amount of water vapor and other foreign matter be allowed to enter the tank, and that excess fluid will drain off into the atmosphere and not into the tank to which the device is attached.

It is also desirable to have a sealing device that can be inexpensively manufactured and installed. One that can be installed as an integral part of the tank wall, or upon the tank, or at a remote location in relation to the tank, without in the least decreasing the operational efficiency of the unit.

It is, therefore, a further object of the invention to provide a liquid sealing means which will provide all of the foregoing features in a simple and relatively inexpensive unitary construction.

With the above and other objects in view, my invention consists in the arrangement, combination and details of construction disclosed in the drawing and specification, and then more particularly pointed out in the appended claims.

In the drawings:

Figure 1 is a vertical section taken on the line 1—1 of Figure 2, of a liquid seal adapted for mounting on the vent pipe or opening of a tank or container, having volatile fluid therein.

Figure 2 is a sectional view taken on the line 2—2 of Figure 1.

Figure 3 is a sectional view taken on the line 3—3 of Figure 1.

Referring to the drawings, the numeral 10 designates generally a cylindrical or outer container embodying a cylindrical side wall 11, a top wall 12 and a bottom wall 13. A pipe or tube 14 is fixed to and extends upwardly through the bottom wall 13, being disposed in the center of the container and the lower projecting end of the pipe 14 is adapted to be fixed in any suitable manner to the vent pipe or opening in the tank containing volatile fluid.

The pipe 14 terminates at its upper end closely adjacent the top wall 12 of the container 10, the purpose for which will be hereinafter described. An inner horizontal wall member 15 is fixed to the side wall 11 between the top and bottom walls and provides a division plate, dividing the inside of the container 10 into a lower chamber 16 and an upper chamber 17.

A cylindrical wall 18 is fixed to the inner side of the top wall 12, depending within the upper chamber 17 and dividing this chamber into an outer compartment or chamber 19 and an inner compartment or inverted cup-like chamber 20. Preferably the wall 18 is disposed eccentrically of the upper chamber 17, as shown in Figure 2. The lower edge or end of the cylindrical member 18 is disposed in spaced relation to the dividing wall 15, providing a space 21 through which fluid and air under pressure may pass from the inner chamber 20 to the outer chamber 19, and from outer chamber 19 to inner chamber 20.

The lower portion of the wall 18 is also formed with a plurality of openings 22 which will assist in the relatively quick communication of pressure and flow of liquid between the two chambers 19 and 20.

The openings 22 also serve to break up the air passing back and forth between chambers 19 and 20 thus preventing surging of the liquid in the two upper chambers 19 and 20 depending on the purpose for which the seal is being used, i. e. to fill or empty the container to which it is attached.

The top wall 12 has a filler plug 23 threaded thereinto which provides inlet means whereby the sealing liquid which is preferably of a non-volatile characteristic may be poured into the upper chamber 19. A tube 24 is fixed to the inner wall 15, projecting therethrough and upwardly into the chamber 19 and having the upper end thereof positioned at a point slightly below the upper end 25 of the tube or pipe 14. The tube 24 provides for discharge of excess liquid from the upper chamber 19 to the lower chamber 16.

A tube 26 is disposed concentrically about the pipe 14, projecting at its upper end into the inner chamber 20 and terminating said upper end at a point below the upper end 25 of pipe 14. The tube 26 also terminates at its lower end, as indicated at 27, a slight distance above the inner side of the bottom wall 13. A tube 28 is fixed to the lower wall 13, being open to the atmosphere at its lower end and extends upwardly through chamber 16, through wall 15, into chamber 19, and terminating at its upper end at a point substantially co-planar with the upper end 25 of the pipe 14. The tube 28 is formed with an opening 29 in the upper portion of the chamber 16 and an opening at the upper end of tube 28 in chamber 19 in order that chambers 16 and 19 will be communicated with the atmosphere at all times.

A tube 30 is fixed to the bottom wall 13, being open at its lower end to the atmosphere and projecting upwardly into chamber 16 to a point spaced downwardly from the opening 29. When the sealing device is initially filled with the non-volatile sealing liquid, chambers 19 and 20 are filled to the level indicated at 31. The pouring of additional liquid into chamber 19 will cause the liquid to overflow into the upper end of tube 24 and also overflow the upper end of tube 26 in chamber 20. The liquid will then flow downwardly into chamber 16 and this chamber will be filled to the level indicated at 32, which is the top of tube 30 and any excess fluid will flow out through the tube 32.

The operation of the construction shown in Figures 1 to 3 is as follows: When the tank to which this invention is attached is in neutral, that is when there is neither pressure or vacuum therein, or the pressure of the tank equals that of the atmosphere, and seal fluid is introduced into the invention through the opening ordinarily closed by filler plug 23, such fluid enters chamber 19 and passes under wall 18, thereby entering chamber 20, and rises, filling these two chambers 19 and 20 to the fluid level 31, and thereupon overflows through tube 26 in chamber 20 and through tube 24 in chamber 19, thereby passing downwardly into chamber 16, filling said chamber 16 to fluid level 32, and thereupon overflowing, the excess fluid passing through tube 30 into the atmosphere. The unit is now ready to function and it is not necessary for the proper functioning that filler plug 23 be replaced. This plug 23 is merely used for the purpose of closing chamber 19 from the top in order to keep foreign matter from entering thereinto. The device may be so made with respect to the relative size of the chambers, and the relative length of the overflow tubes, as to create any desired resistance of the seal fluid to either vacuum or pressure in the tank. The greater the column of seal fluid that is used to relieve either pressure or vacuum, the greater will be the resistance thereto.

When the unit is charged with seal fluid and a vacuum begins to form in the tank due either to the emptying of the contents therefrom or due to contraction caused by cooling and condensation of the contents in such tank as is often the case at night, this vacuum or negative pressure will be communicated through tube 14 to chamber 20, causing a pressure differential between the atmospheric pressure existing in chamber 19 and the decreased pressure in chamber 20, and resulting with the forcing downwardly of the fluid level in chamber 19 and the simultaneous rising of the fluid level in chamber 20. (Since the fluid level in chamber 20 was already at 31, and even with the top of the overflow tube 26, this fluid will rise over the top of the tube 26 and will begin to flow therethrough.) This pressure differential also exists between lower chamber 16 where atmospheric pressure is exerted at all times upon the surface of the seal fluid contained therein, and upper inner chamber 20 where the vacuum exists, such vacuum being communicated to the seal fluid in the lower chamber through overflow tube 26. As the pressure decreases in chamber 20 and also in tube 26 above the level of the seal fluid therein, such seal fluid will be forced to rise in tube 26 by the atmospheric pressure on the surface thereof in chamber 16. The unit is so designed, however, that excess sealing fluid in upper chamber 20 will overflow into tube 26 before the liquid in that tube can rise to the top thereof, and when there is no excess fluid, the vacuum will be relieved by the venting process hereinafter described before the seal fluid in tube 26 can rise to the top thereof.

Since the fluid level in chamber 20 was already at 31, and even with the top of the overflow tube 26, this fluid will rise over the top of tube 26 and will begin to siphon, and as long as there is any vacuum in chamber 20 this siphon effect will continue until all the excess seal fluid in that chamber and in chamber 19 is siphoned out thereof. This siphoning effect will cease when the descending level of the seal fluid in chamber 19 reaches the ports 22, whereupon air will break through these ports into chamber 20, rising in bubbles through the seal fluid in chamber 20, and thus breaking the siphon action in that chamber and in tube 14 sufficient to allow the seal fluid to rise in chamber 19, covering ports 22. The excess seal fluid that overflowed from chamber 20 through tube 26 and into chamber 16 would create a surplus of seal fluid in chamber 16, which would in turn flow out of that chamber through tube 30 and into the atmosphere.

Due to the fact that opening 25 of tube 14, venting the tank, is higher in chamber 20 than is leveling tube 26, it is impossible for any of the seal fluid to enter the tank while the unit is operating on vacuum, even though there may exist an excess amount of fluid in the unit.

If the unit is on vacuum and an excessive charge of seal fluid is introduced through the filler plug 23, the seal will remain in effect during the entire charging operation, and the excess seal fluid will merely run through the unit as described above, and eventually will run out into the atmosphere again, without any possibility of this seal fluid, during such operation, entering the tank.

When the unit is on vacuum, and cool moist air is being drawn into the tank, resulting in a condensation of such moisture as it passes through the seal unit, and thereby adding to the volume of the seal fluid if such water is of less density than the sealing fluid, it will rise to the top thereof, and will flow out of the unit, through the overflow tubes and into the atmosphere without any of such water entering and contaminating the contents of the tank.

Dust particles and other foreign matter will be filtered out of the air passing through the sealing fluid, thus allowing clean pure air to enter the tank.

Now on the other hand, when the unit is initially charged, and fuel is being pumped into the tank or the contents of the tank begin to evaporate and expand due to the rise of temperature during the daytime, a pressure will be created in the tank and will be communicated through tube 14 into chamber 20 of this invention, and therein will force the fluid level downwardly, the fluid passing through ports 22 and space 21, and rising upwardly in chamber 19, the excessive fluid passing out through the overflow tube 24, until the fluid in chamber 20 descends to the level of the ports 22, whereupon air bubbles will pass through these ports and the seal will "break," relieving the excess pressure in the tank. When this "pressure" exists in chamber 20, it will also be communicated through overflow tube 26 to the surface of the sealing liquid contained in the lower portion of that tube. This "pressure" from the tank being greater than the atmospheric pressure which is constantly exerted on the surface of the seal fluid in chamber 16, will force the liquid downwardly in tube 26 until either the pressure is not great enough to force it further, or until the excess pressure is relieved by the passage of air through ports 22 in the wall of chamber 20 above. It is important to note that the column of the seal fluid in tube 26 is greater than the column in chamber 19, supported by the pressure in chamber 20, and for this reason the seal will break before any air can escape down tube 26 through opening 27 into chamber 16. The same amount of column will be displaced in tube 26 downwardly from fluid level 32, as is displaced in chamber 20 downwardly from fluid level 31, both columns being displaced by the pressure coming from the tank through tube 14 into chamber 20. This process is just reversed (movement of fluid column in tube 26) when the unit operates on vacuum. Chamber 16 serves as an overflow reservoir, and the movement of the fluid contained therein, as described in this paragraph, serves to operate as a stabilizing factor in the operation of the unit.

The movement of the column of seal fluid into either chamber 19 or chamber 20 when there is in the tank, either pressure or vacuum, allows a considerable amount of expansion or contraction of the gases in the tank without any of the outside air being drawn into the tank through the unit. This latitude of operation without any actual venting is an important factor in this unit which makes it effective in the conservation of the contents of the tank, and for the prevention of the entrance into the tank of outside atmosphere laden with water vapor.

After the sealing device such as the structure shown in Figure 1 has been filled to the levels 31 and 32 in chambers 19, 20 and 16, in the event pressure is generated in the tank with which pipe 14 is connected, this pressure will be communicated to the upper inner chamber 20. This pressure will force the liquid level 31 to lower, forcing the liquid in the inner upper chamber 20 to flow into the outer upper chamber 19. When the liquid in the outer chamber 19 rises above the level 31, the liquid will flow into lower chamber 16, through pipe 24, and as this additional liquid in chamber 16 will raise the level 32, the added liquid in chamber 16 will overflow through pipe 30 into the atmosphere. In the event there is a suction or partial vacuum created in upper chamber 20, caused by removing the liquid from the main tank, the suction in chamber 20 will draw the liquid in this chamber upwardly so that it will overflow into pipe or tube 26. This will allow the liquid in the chambers 20 and 19 to pass into the lower chamber 16 and so raise the level of the liquid in chamber 16 above line 32 with the excess fluid being caused to overflow through pipe 30 into the atmosphere, and when the excess seal fluid has been discharged there remains in the unit the necessary amount of fluid for its operation. When the fluid in chamber 20 has risen to the level of the top of tube 26, having passed through ports 22 in wall 18 into chamber 20, that fluid will overflow into tube 26 and begin to flow into chamber 16 and continues to flow therethrough until the pressure of the fluid has become substantially the same in all of the chambers 16, 19 and 20.

With a liquid seal as hereinbefore described, the tank containing the volatile fluid may be either filled or discharged without breaking the seal, and foreign particles will be prevented from entering the tank through the vent of the tank by the constant maintaining of the liquid seal by the device hereinbefore described.

Sealing liquid can be added to the units when necessary, and while it is in operation at maximum capacity without interfering with its operation, or breaking the seal of the unit, or container to which it is attached.

I do not mean to confine myself to the exact details of construction herein disclosed, but claim all variations falling within the purview of the appended claim.

What I claim is:

A liquid sealing device for attachment to the vent of a tank comprising a housing having side, top and bottom walls, an inner horizontal wall dividing said housing into upper and lower seal chambers, a pipe extending through said bottom wall and said inner wall and terminating at a point in said upper chamber adjacent said top wall, said pipe adapted to be connected to the vent of said tank, a depending circular wall fixed to said top wall and dividing said upper chamber into inner and outer chambers, a tube about said pipe projecting into said upper inner chamber and into said lower chamber, said tube terminating in said upper chamber below the upper end of said pipe, a second tube fixed to said inner wall and extending into said upper outer chamber and communicating the upper portion of said upper outer chamber with the upper portion of said lower chamber, the upper end of said second tube being coplanar with the upper end of said first tube, a third tube in said lower chamber communicating the upper portion of the latter with the atmosphere, said depending circular wall carried by said top wall having the lower end thereof spaced from said inner horizontal wall, and a second pipe fixed to said bottom wall extending upwardly through said inner wall into said outer upper chamber and terminating coplanar with the top of said first pipe, said second pipe having an opening within said lower chamber above the upper end of said third tube.

KEITH M. ADAIR.

REFERENCES CITED

The following references are of record in the file of this patent:

UNITED STATES PATENTS

| Number | Name | Date |
|---|---|---|
| 1,992,875 | Mobley | Feb. 26, 1935 |
| 2,037,731 | Mobley | Apr. 21, 1936 |
| 2,370,040 | Jackson | Feb. 20, 1945 |
| 2,384,147 | Wiggins | Sept. 4, 1945 |

FOREIGN PATENTS

| Number | Country | Date |
|---|---|---|
| 421,838 | Great Britain | Jan. 1, 1935 |